US012415202B2

(12) United States Patent
Clough

(10) Patent No.: US 12,415,202 B2
(45) Date of Patent: Sep. 16, 2025

(54) APPLICATOR

(71) Applicant: Airbus Operations Limited, Bristol (GB)

(72) Inventor: James Clough, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/809,839

(22) Filed: Aug. 20, 2024

(65) Prior Publication Data

US 2025/0065357 A1 Feb. 27, 2025

(30) Foreign Application Priority Data

Aug. 25, 2023 (GB) ..................................... 2313016

(51) Int. Cl.
*B05C 5/02* (2006.01)
*B05C 11/02* (2006.01)

(52) U.S. Cl.
CPC ............ *B05C 5/0254* (2013.01); *B05C 5/027* (2013.01); *B05C 11/028* (2013.01)

(58) Field of Classification Search
CPC ......... B05C 5/0254; B05C 5/027; B05C 5/05; B05C 11/028
USPC ......................................... 401/261, 265, 266
See application file for complete search history.

(56) References Cited

U.S. PATENT DOCUMENTS 5,882,133 A * 3/1999 Chao ................. B05C 17/00516 401/5
6,276,858 B1 * 8/2001 Kennedy ........... B05C 17/00516 401/265
6,981,611 B2 * 1/2006 Carruth ............. B05C 17/00516 401/266
2004/0149204 A1 8/2004 Park
2011/0061589 A1 3/2011 Ando
2017/0128974 A1 5/2017 Liao
(Continued)

FOREIGN PATENT DOCUMENTS

DE 102013219628 A1 4/2014
EP 1749586 A1 2/2007
(Continued)

OTHER PUBLICATIONS

British Search Report issued in GB Application No. 2313016.4, dated Feb. 7, 2024.
(Continued)

*Primary Examiner* — David J Walczak
(74) *Attorney, Agent, or Firm* — KDW Firm PLLC

(57) ABSTRACT

An applicator for applying an adhesive film to a surface of an aircraft component includes an adhesive inlet for receiving adhesive from a source of adhesive, adhesive outlets for dispensing of adhesive therethrough, one or more reservoirs for receiving adhesive from a respective adhesive outlet, channels wherein at least two of the channels are configured to facilitate delivery of adhesive from the adhesive inlet to a respective, mutually-different outlet, and one or more adhesive-contacting surfaces for contacting adhesive dispensed from the adhesive outlets into the reservoir and for forming an adhesive film therefrom, the one or more adhesive-contacting surfaces being configured to be maintained in spaced relationship with a surface onto which an adhesive film is to be formed.

20 Claims, 2 Drawing Sheets

(56) References Cited

U.S. PATENT DOCUMENTS

| | | | |
|---|---|---|---|
| 2022/0314241 | A1 | 10/2022 | Giannazzo |
| 2024/0174480 | A1 | 5/2024 | Scraggs |
| 2024/0174482 | A1 | 5/2024 | Scraggs |
| 2024/0207884 | A1 | 6/2024 | Scraggs |
| 2024/0207887 | A1 | 6/2024 | Scraggs |
| 2024/0208048 | A1 | 6/2024 | Scraggs |

FOREIGN PATENT DOCUMENTS

| | | | |
|---|---|---|---|
| EP | 1767332 | A1 | 3/2007 |
| EP | 2711088 | A1 | 3/2014 |
| GB | 1578018 | A | 10/1980 |
| WO | 0126824 | A1 | 4/2001 |
| WO | 2005115720 | A1 | 12/2005 |
| WO | 2014022880 | A1 | 2/2014 |
| WO | 2021195836 | A1 | 10/2021 |

OTHER PUBLICATIONS

Extended European Search Report in EP Application No. 24195730.7, dated May 26, 2025, 12 pages.

* cited by examiner

APPLICATOR

TECHNICAL FIELD

The present disclosure relates to the application of adhesive.

The disclosure herein concerns the application of adhesive. More particularly, but not exclusively, the disclosure herein concerns an adhesive applicator. The disclosure herein also concerns an adhesive dispensing arrangement.

BACKGROUND

Adhesive is applied to surfaces of certain aircraft components to adhere two or more aircraft components. Traditionally, a bead of adhesive is applied to a surface and the bead is spread across the surface using a spatula. This is a relatively skilled job in that it is difficult to achieve a strip of adhesive that has the same thickness throughout. This technique is also time-consuming. Rollers may also be used to apply adhesive, but this is time-consuming and it is difficult to achieve a strip of uniform thickness. Furthermore, fibrous rollers may shed fibers, potentially causing foreign object contamination issues. GB2533313 describes a tool that uses a regulating roller in order to achieve deposition of a strip of adhesive of uniform thickness. While this tool performs well, it is complex, relatively expensive and it is time-consuming to clean.

The disclosure herein seeks to mitigate the above-mentioned problems. Alternatively or additionally, the disclosure herein seeks to provide an improved adhesive applicator.

SUMMARY

The disclosure herein provides an applicator for applying an adhesive film to a surface of a workpiece, the applicator comprising:

- an inlet for receiving adhesive from a source of adhesive;
- a plurality of outlets for the dispensing of adhesive therethrough;
- a plurality of channels, at least two of the channels being configured to facilitate delivery of adhesive from the inlet to a respective, mutually-different outlet;
- one or more reservoirs for receiving adhesive from a respective outlet; and
- one or more adhesive-contacting surfaces for contacting adhesive deposited onto the surface, in a reservoir, as the applicator is moved across the surface, thereby forming a film of adhesive on the surface;
- one or more adhesive-contacting surfaces being configured to be maintained in spaced relationship with a surface onto which an adhesive film is to be formed.

Those skilled in the art will realize that the source of adhesive is not necessarily part of the applicator of the disclosure herein. In use, adhesive or other suitable liquid is dispensed from the outlets into one or more reservoirs onto a surface, and when the applicator is moved over the surface (preferably slid over the surface), the one or more adhesive-contacting surfaces contact the adhesive, with the spacing between the surface and the adhesive-contacting surfaces determining the thickness of the adhesive film.

Embodiments of the applicator of the disclosure herein have been found to permit rapid and effective deposition of an adhesive film. Furthermore, embodiments of the applicator of the disclosure herein are simple and relatively inexpensive. Optionally, at least one, optionally more than one and optionally each reservoir may be configured to provide a covered space when the applicator is in contact with a surface onto which adhesive is to be deposited.

The applicant has discovered that the provision of a reservoir for receiving adhesive that provides a covered space helps retain adhesive and inhibits loss of the adhesive from the applicator. Furthermore, the covering of the reservoir enables the applicator to be used in an inverted or otherwise non-upright orientation without adhesive being lost from the applicator. The shape and size of a reservoir may be configured so that a reasonable amount of adhesive may accumulate in the inlet reservoir, which may help if a greater amount than expected of adhesive is delivered to the reservoir.

The depth of the reservoir relative to a base of the applicator may be greater adjacent to the adhesive outlets than adjacent to the one or more adhesive-contacting surfaces. This ensures that sufficient adhesive is provided so that a uniform film of adhesive may be formed. Optionally, the depth of the reservoir varies in a linear manner between the adhesive outlets and the one or more adhesive-contacting surfaces.

As mentioned above, the applicator may comprise a base. The base is optionally substantially planar or flat.

The cross-sectional area of the reservoir (optionally normal to a longitudinal axis of the applicator, the longitudinal axis of the applicator optionally being defined as the intended direction of movement of the applicator) adjacent to the adhesive outlets is optionally greater than the cross-sectional area of the reservoir adjacent to the one or more adhesive-contacting surfaces. This ensures that sufficient adhesive is provided so that a uniform film of adhesive may be formed. Optionally, the cross-sectional area of the reservoir varies in a linear manner between the adhesive outlets and the one or more adhesive-contacting surfaces.

At least one and optionally each reservoir may comprise a surface which, when the applicator is placed against a surface onto which a film is to be formed, forms a covered space. The height of the reservoir surface relative to a base of the applicator may be greater adjacent to the outlets than adjacent to the one or more adhesive-contacting surfaces.

Preferably, each of the channels is configured to facilitate delivery of adhesive from the adhesive inlet to a respective, mutually-different adhesive outlet.

Preferably, a channel extends between the adhesive inlet and each adhesive outlet.

The applicator may comprise a base. The base is optionally configured to contact a surface onto which an adhesive film is to be deposited. The one or more adhesive-contacting surfaces may be in spaced relationship with the base. This facilitates maintaining the adhesive contacting surface(s) in spaced relationship with the surface onto which a film of adhesive is to be formed. The base is preferably flat. The height of the lowest part of the one or more adhesive-contacting surface relative to the base may be at least 0.2 mm, optionally at least 0.4 mm, optionally at least 0.6 mm, optionally at least 0.8 mm and optionally at least 1.0 mm. The height of the lowest part of the one or more adhesive-contacting surface relative to the base may be no more than 5.0 mm, optionally no more than 3.0 mm, optionally no more than 2.0 mm, optionally no more than 1.5 mm and optionally no more than 1.0 mm.

The applicator may comprise rails for retaining the applicator in position relative to a surface onto which an adhesive film is to be formed. The rails may define a gap therebetween for the receipt of a workpiece. The applicator may comprise at least two rails, each rail optionally being proximate to, or defining, an edge of the applicator. At least one and optionally each rail may be elongate. At least two rails may optionally face one another. At least two rails may be located either side of the base, if a base is present. At least one and optionally more than one rail may project away from the base.

In use, the applicator may be placed on to a workpiece onto which a film of adhesive is to be dispensed, the workpiece being received in the gap between the rails, with the rails being adjacent to the workpiece. The distance between the rail and the adjacent workpiece would typically be relatively small and would not allow much "play" or rotation of the applicator relative to the workpiece. The distance between the rail and the workpiece would permit movement of the applicator along a workpiece so as to be able to form a film of adhesive on the workpiece.

The applicator may optionally comprise at least 3 outlets, optionally at least 4 outlets, optionally at least 5 outlets, optionally at least 6 outlet and optionally at least 7 outlets.

The applicator may optionally comprise no more than 20 outlets, optionally no more than 18 outlets, optionally no more than 16 outlets, optionally no more than 14 outlets, optionally no more than 12 outlets and optionally no more than 10 outlets.

The outlets may optionally be regularly spaced. For example, the separation of adjacent outlets may be the same for all pairs of adjacent outlets.

Optionally, the outlets may be irregularly spaced. For example, the separation of two adjacent outlets, being a first pair of outlets, may be different from the separation of two adjacent outlets, being a second pair of outlets, at least one of which is different from the first pair of outlets.

The size (for example, the cross-sectional area) of the outlets may be the same or may be different. At least one, optionally more than one and optionally each outlet may have a cross-sectional area of at least 0.5 $mm^2$, optionally at least 1.0 $mm^2$, optionally at least 1.5 $mm^2$, optionally at least 2.0 $mm^2$, optionally at least 2.5 $mm^2$ and optionally at least 3.0 $mm^2$. At least one, optionally more than one and optionally each outlet may have a cross-sectional area of no more than 10 $mm^2$, optionally no more than 8.0 $mm^2$, optionally no more than at least 6.0 $mm^2$, optionally no more than 5.0 $mm^2$, optionally no more than 4.0 $mm^2$ and optionally no more than 3.0 $mm^2$.

The shape (for example, the cross-sectional shape) of the outlets may be the same or different. The cross-sectional shape of at least one, optionally more than one, and optionally each outlet may optionally by elongate, sausage-shaped, circular, elliptical, oval, square or rectangular. In this connection, "sausage-shaped" indicates that the outlet is elongate in cross-section, with rounded (for example, semi-circular) ends.

The outlets may optionally be arranged along a straight line. The outlets may optionally be arranged along a curved line.

The applicator may be configured such that at least one, optionally more than one and optionally each outlet is in spaced relationship with the surface onto which an adhesive film is to be formed. At least one, optionally more than one and optionally each outlet is in spaced relationship with a base, if the applicator comprises a base. The applicant has discovered that it is beneficial for the outlets to be raised relative to the surface on which an adhesive film is to be formed. Such an arrangement facilitates the well-controlled deposition of the adhesive from the outlets, which, in turn, facilitates the well-controlled formation of an adhesive film.

At least one, optionally more than one and optionally each channel is substantially linear.

Optionally, at least a portion of at least one, optionally more than one and optionally each channel extends radially from the inlet.

Optionally, at least one, optionally more than one and optionally each channel extends radially from the inlet.

Optionally, the channels have substantially the same cross-sectional shape as one another.

Optionally, the channels have substantially the same cross-sectional size as one another. This typically facilitates even deposition of adhesive.

Optionally, the channels may be arranged in a splayed or fan arrangement. Such an arrangement is convenient and facilitates even deposition of adhesive across a surface.

Optionally, the channels are coplanar i.e. they are located in a plane. Optionally, the applicator may be configured so that the plane is substantially parallel to a surface onto which an adhesive film is to be deposited. The plane may be substantially parallel to an applicator base, if the applicator comprises a base.

The applicator may comprise one, and only, one reservoir. The applicator may comprise more than one reservoir. For example, a first reservoir may be configured to receive adhesive from a first set of outlets, and a second reservoir may be configured to receive adhesive from a second set of outlets.

The reservoir(s) may optionally extend laterally across the applicator. The reservoir may have a width, the width being measured in a direction normal to the direction of intended movement of the applicator. The width of the reservoir(s) may be approximately the same as a width of the adhesive-contacting surface(s). The volume of the reservoir(s) is optionally greater than the volume bounded by the adhesive-contacting surface(s) and a surface onto which the film of adhesive is to be formed. The mean height of a surface forming the reservoir, relative to the base of the applicator, may optionally be greater than the mean height of the adhesive-contacting surface.

The applicator may comprise one, and only one, adhesive-contacting surface. Alternatively, the applicator may comprise more than one adhesive-contacting surface. The adhesive-contacting surface(s) may extend laterally across the applicator.

The adhesive-contacting surface(s) may optionally be rearward of the reservoir, bearing in mind that a forwards direction is the intended direction of movement of the applicator in order to deposit a film of adhesive. The adhesive-contacting surface(s) may optionally project rearwardly, relative to the reservoir(s). The adhesive-contacting surface(s) may have a length (i.e. a dimension in a direction parallel to the intended direction of movement of the applicator in order to deposit a film) of at least 1.5 mm, optionally at least 2.0 mm, optionally at least 2.5 mm, optionally at least 3.0 mm, and optionally at least 5.0 mm. The adhesive-contacting surface(s) may have length (i.e. a dimension in a direction parallel to the intended direction of movement of the applicator in order to deposit a film) of no more than 20 mm, optionally no more than 15 mm, optionally no more than 10 mm and optionally no more than 5.0 mm.

The adhesive-contacting surface(s) may optionally be substantially planar or flat.

The adhesive-contacting surface(s) may optionally be substantially parallel to a surface onto which a film of adhesive is to be deposited. If the applicator has a base, then the adhesive-contacting surface(s) may optionally be substantially parallel to the base.

The applicator may optionally comprise a dispenser-receiving portion. The dispenser-receiving portion may comprise a space for the receipt of a dispenser. The dispenser-receiving portion may comprise a nozzle-receiving portion. The nozzle-receiving portion may be configured to receive a cylindrical, conical or frusto-conical nozzle.

The dispenser-receiving portion may be configured to receive a dispenser such that the dispenser is located to dispense adhesive to the adhesive inlet. For example, a nozzle-receiving portion may be located proximate the adhesive inlet to facilitate dispensing of adhesive to the adhesive inlet.

The applicator may comprise an applicator main body. One or more of the adhesive inlet, adhesive outlets(s), reservoir(s) and adhesive-contacting surface(s) may be provided by the applicator main body. The main body is optionally substantially rigid. Provision of such elements of the applicator by a main body (particularly a rigid main body) helps provide a physically-resilient applicator that it not readily deformed or broken. The main body may comprise the base, if the applicator comprises a base.

The applicator is typically of a size to be suitable for use as part of a handheld dispensing arrangement.

The applicator may be configured to be pulled in order to form a film of adhesive. Alternatively, the applicator may be configured to be pushed in order to form a film of adhesive.

The applicator may be configured to deposit a film of adhesive having a width of at least 10 mm, optionally at least 15 mm, optionally at least 20 mm, optionally at least 25 mm, optionally at least 30 mm and optionally at least 35 mm.

The applicator may be configured to deposit a film of adhesive having a width of no more than 150 mm, optionally no more than 125 mm, optionally no more than 100 mm, optionally no more than 80 mm, optionally no more than 60 mm, optionally no more than 50 mm and optionally no more than 40 mm.

Those skilled in the art will realize that the applicator is suitable for the application of adhesive. Those skilled in the art will realize that the applicator may be used for the application of liquids other than adhesives.

According to a second aspect of the disclosure herein, there is provided an adhesive applicator for forming an adhesive film on a workpiece, the applicator comprising:

- an inlet for receiving adhesive from a source of adhesive;
- an applicator main body providing:
- a plurality of outlets for the dispensing of adhesive therethrough;
- a reservoir for receiving adhesive from the adhesive outlets;
- a plurality of channels, each of which is configured to facilitate delivery of adhesive from the adhesive inlet to a respective outlet;
- a base; and
- one or more adhesive-contacting surfaces for contacting adhesive deposited onto the surface, in a reservoir, as the applicator is moved across the surface, thereby forming a film of adhesive on the surface,
- the one or more adhesive-contacting surfaces being configured to be maintained in spaced relationship with a surface onto which an adhesive film is to be formed; and
- rails for retaining the applicator in position relative to a surface onto which a film of adhesive is to be formed, the rails defining a gap therebetween for the receipt of a workpiece.

The applicator of the second aspect of the disclosure herein may comprise one or more of the features of the applicator of the first aspect of the disclosure herein.

For example, the applicator main body may also provide the inlet and/or the rails.

According to a third aspect of the disclosure herein, there is provided an adhesive dispensing arrangement comprising an applicator in accordance with the first and/or second aspect of the disclosure herein and an adhesive dispenser configured to dispense adhesive via the adhesive applicator.

The applicator may be attachable to, and removable from, the adhesive dispenser. Alternatively, the applicator may be integral with an adhesive dispenser. The adhesive dispenser may, for example, comprise a trigger-actuated dispenser.

The applicator of the first and second aspects of the disclosure herein have been found to be of particular use in depositing liquids, such as adhesives, onto aircraft components. In accordance with a fourth aspect of the disclosure herein, there is therefore provided a method of depositing liquid (for example, adhesive) on to a workpiece surface (particularly a surface of an aircraft component) comprising depositing the liquid using an applicator in accordance with the first and/or second aspect of the disclosure herein.

For the avoidance of doubt, the deposited adhesive, prior to contacting the adhesive with an adhesive-contacting surface, is not in the form of a deposited strip of well-defined width and thickness. Adhesive is deposited into the reservoir; it is the contacting of the adhesive-contacting surface with the adhesive, coupled with the movement of the adhesive-contacting surface over the adhesive that causes the formation of a strip of well-defined thickness and width.

The method may comprise continuously depositing adhesive onto the surface of the one or more aircraft components and continuously moving at least one of the adhesive-contacting surface and the applicator.

The method may comprise manual movement of the applicator. Alternatively, the method may comprise automated movement of the applicator and/or the adhesive contacting surface. For example, one or both of the applicator and the adhesive-contacting surface may be mounted to an automated motion system, such as a robot.

It will, of course, be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1:
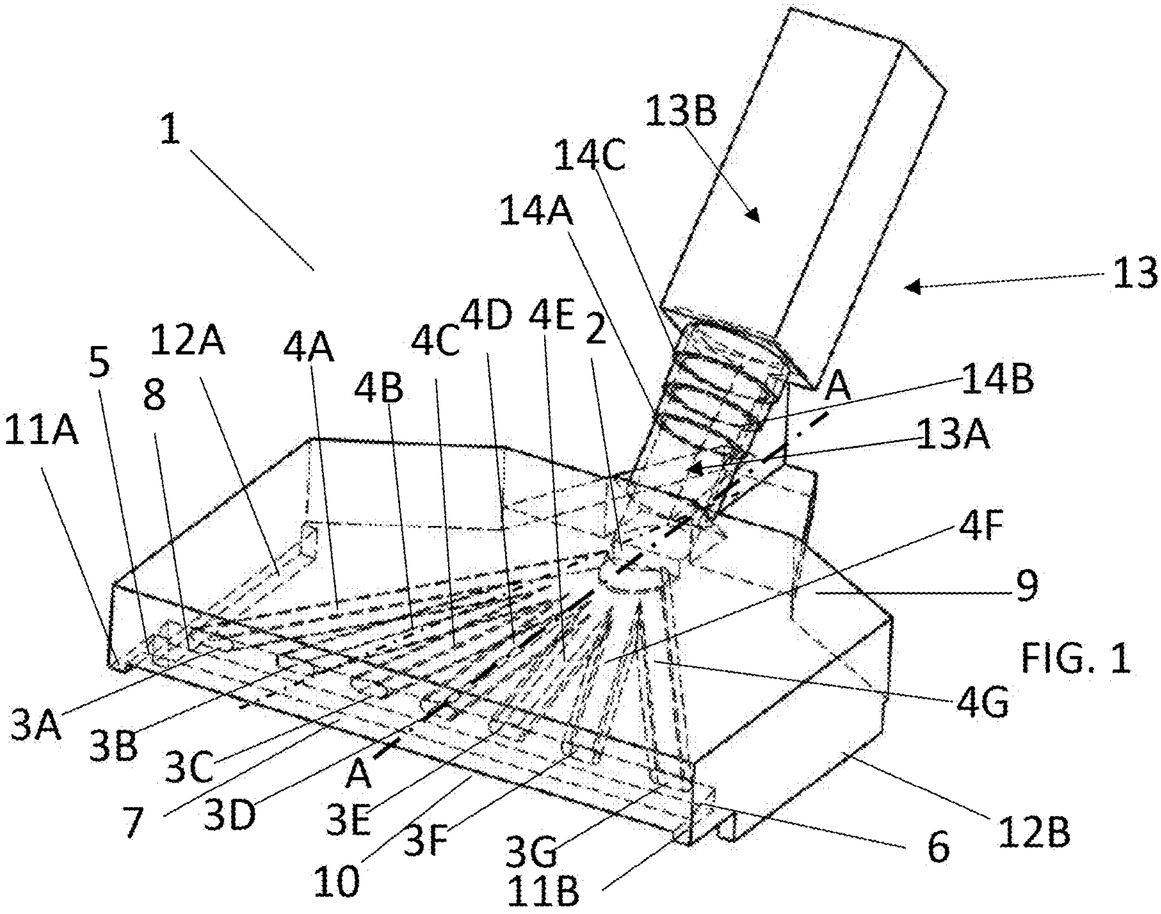
FIG. 1 shows a perspective "transparent" view of an adhesive applicator according to a first embodiment of the disclosure herein.
Figure 2:
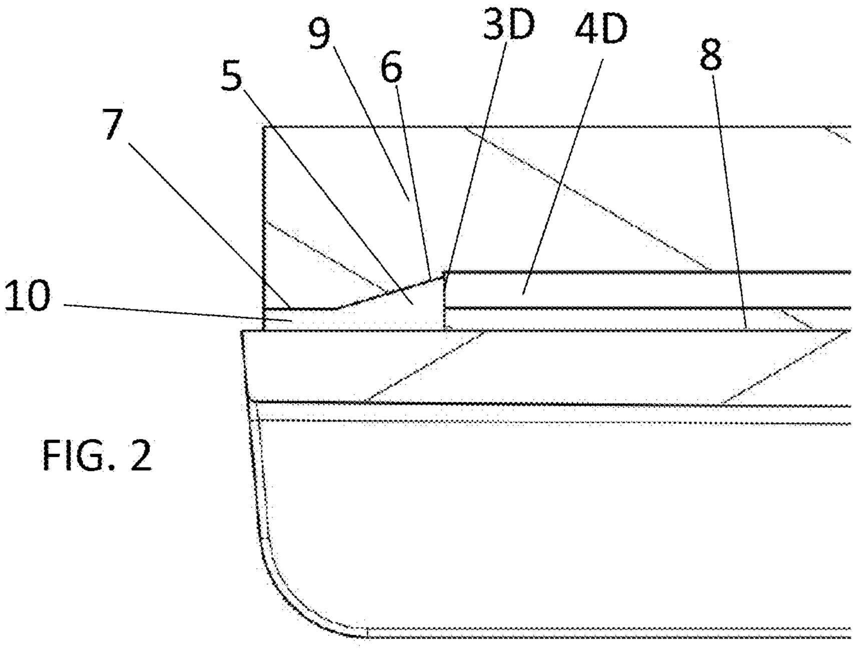
FIG. 2 shows a cross-sectional view of the adhesive applicator of FIG. 1, the cross-section taken along line AA.
Figure 3:
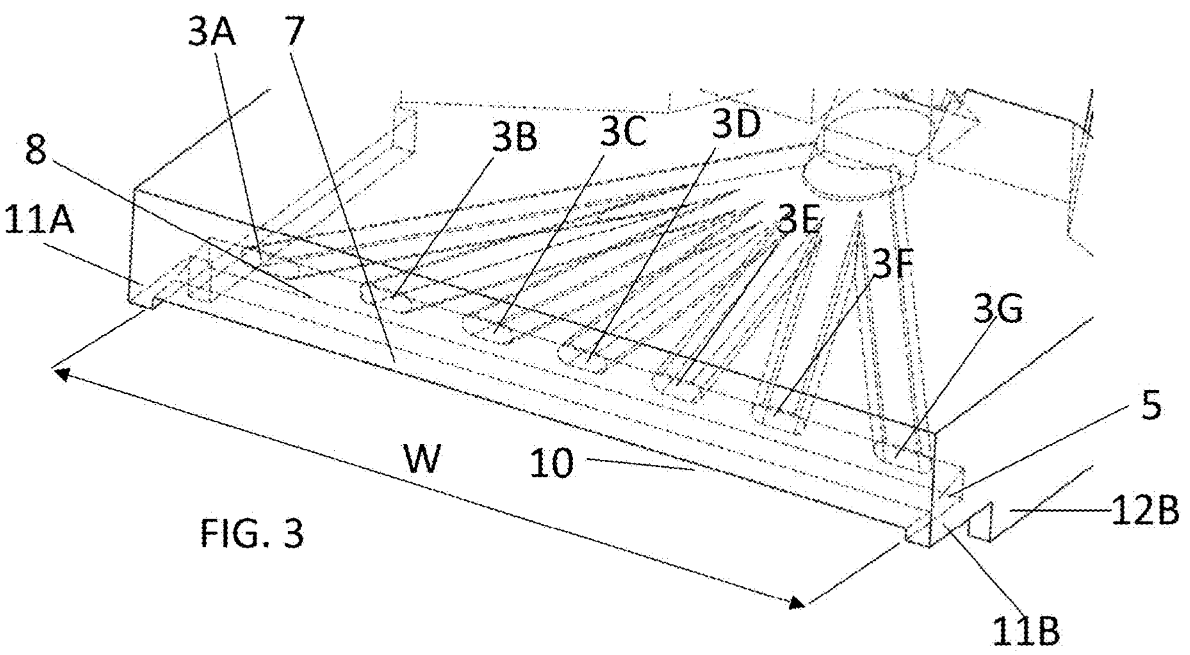
FIG. 3 shows a detail of FIG. 1.

An embodiment of an applicator according to the disclosure herein will now be described by way of example only with reference to FIGS. 1, 2, 3 and 4. The applicator, which is denoted generally by reference numeral 1, comprises an adhesive inlet 2 for receiving adhesive from a source of adhesive and a plurality of adhesive outlets 3A-G for the dispensing of adhesive therethrough. The applicator 1 comprises a plurality of channels 4A-G, each of which is configured to facilitate delivery of adhesive from the adhesive inlet 2 to a respective outlet 3A-G. Adhesive is delivered to adhesive inlet 2 and passes through the seven channels 4A-G to seven outlets 3A-G. A reservoir 5 is provided for receiving adhesive from adhesive outlets 3A-G. The applicator 1 comprises an adhesive-contacting surface 7 for contacting adhesive dispensed from the adhesive outlets 3A-G into the reservoir 5 and for forming an adhesive film therefrom. The applicator 1 is moved in a forwards direction denoted by arrow F in FIG. 4 in order to form a film of adhesive. The adhesive-contacting surface 7 is configured to be maintained in spaced relationship with a surface onto which an adhesive film is to be formed. This ensures that, as the adhesive-contacting surface 7 is moved across the adhesive formerly stored in the reservoir 5 the resulting film of adhesive is of uniform depth.

The general operation of the applicator 1 will now be described. Source of adhesive 50 is mounted to the applicator 1 so that the source 50 of adhesive is able to deliver adhesive to adhesive inlet 2. The applicator 1 is then placed onto a workpiece WP having a surface S onto which a film L of adhesive will be formed. Adhesive is delivered from the source 50 of adhesive to adhesive inlet 2. Adhesive passes from adhesive inlet 2 to adhesive outlets 3A-G via channels 4A-G. Adhesive passes out of outlets 3A-G into reservoir 5, filling reservoir 5. As the adhesive is being dispensed, the applicator 1 is moved along the workpiece WP in a direction shown by arrow F (this being considered to be a forwards direction with respect to the applicator 1). This movement of the applicator 1 causes the movement of adhesive-contacting surface 7 over adhesive previously located in reservoir 5, causing the formation of a film L of adhesive of the desired thickness and width, as explained further below.

Adhesive-contacting surface 7 extends across the applicator 1 and has a width W of about 38 mm, the same as the width of reservoir 5, and the same as the width of surface S of the workpiece WP onto which a film L of adhesive is to be deposited. Adhesive-contacting surface 7 is substantially planar and is substantially parallel to base 8 and therefore to surface S onto which a film L is to be deposited. Adhesive-contacting surface 7 extends rearwardly for a distance of about 3 mm, has a height of about 0.6 mm relative to base 8, and therefore has a height of about 0.6 mm relative to surface S onto which a film L is to be deposited. When the applicator 1 is placed on a surface S, adhesive-contacting surface 7 and arms 11A, B form a slot 10 that is moved over adhesive present in reservoir 5. The width and depth of slot 10 determines the width and depth of film L of adhesive that is formed in the surface S of workpiece WP. For the avoidance of doubt, it should be noted that the width of the slot 10 need not be exactly the same as the width of film L. Similarly, the depth of slot 10 need not be exactly the same as the depth of film L. The provision of an adhesive-contacting surface 7 that extends away from reservoir 5 and that is substantially parallel to base 8 (and therefore the surface S) facilitates the deposition of a uniform film L.

The applicator 1 comprises seven channels 4A-G, each of which is in fluid communication with adhesive inlet 2. Adhesive delivered to adhesive inlet 2 passes into channels 4A-G. Each channel 4A-G has a sausage-shaped cross-section (i.e. slightly elongate cross-section, with rounded, semi-circular ends), has a cross-sectional height of 1 mm and a cross-sectional width of 2 mm. The channels 4A-G are in a fan formation relative to adhesive inlet 2. This fan formation provides a suitable arrangement for forming a relatively broad film of adhesive from a relatively narrow source of adhesive. The channels 4A-G are planar i.e. they are in a plane. The plane is substantially parallel to the base 8 of the applicator 1, and is therefore substantially parallel to the surface S onto which a film of adhesive is to be deposited. Such an arrangement of channels provides a relatively compact applicator. Each channel 4A-G delivers adhesive to a respective outlet 3A-G. Each outlet 3A-G has a cross-sectional height of 1 mm and a cross-sectional width of 2 mm, and each outlet 3A-G is raised above the base 8 of applicator 1. In this case, the bottom of each outlet 3A-G is about 0.5 mm above base 8. The outlets 3A-G are evenly spaced in a straight line. This facilitates even deposition of adhesive over a relatively broad workpiece WP.

Applicator 1 comprises a rigid main body 9. Adhesive inlet 2, adhesive outlets 3A-G and channels 4A-G are formed in main body 9. Reservoir 5, surface 6 that forms a surface of reservoir 5 and adhesive-contacting surface 7 are provided by main body 9. The rigidity of main body 9 inhibits unwanted deformation of the applicator 1 and, in particular, keeps adhesive-contacting surface 7 in the desired shape and at the desired spacing from surface S on which film is to be formed.

As mentioned above, the applicator 1 comprises reservoir 5, which receives adhesive from outlets 3A-G. Reservoir 5 facilitates the collection of a volume of adhesive, which ensures that film L is formed across the entire width W of the workpiece WP and is formed to the desired depth. In this connection, surface 6 that defines reservoir 5 has a mean height relative to base 8 that is greater than the height of the adhesive-contacting surface 7. The height of surface 6 that defines reservoir 5 relative to the base 8 is greater adjacent the outlets 3A-G than adjacent the adhesive-contacting surface. Therefore, the cross-sectional area of the reservoir 5 adjacent to the outlets 3A-G and normal to the direction of movement F is greater than the cross-sectional area of the reservoir 5 adjacent to adhesive-contacting surface 7. This provides a decrease in cross-sectional area of the reservoir 5 as the applicator 1 is moved. This ensures that a film L having the desired width and depth is formed.

The applicator 1 comprises two parallel, elongate lateral rails 12A, B that extend away from the applicator main body 9, thereby defining a gap therebetween for the receipt of workpiece WP. The gap between the rails 12A, B is sufficiently large to accommodate workpiece WP, but is sufficiently small so that rotation and/or lateral movement of the applicator 1 relative to the workpiece WP is inhibited.

The applicator 1 described above has been found to be particularly effective at depositing a uniform film of adhesive that is about 0.5 mm thick.

Figure 4:
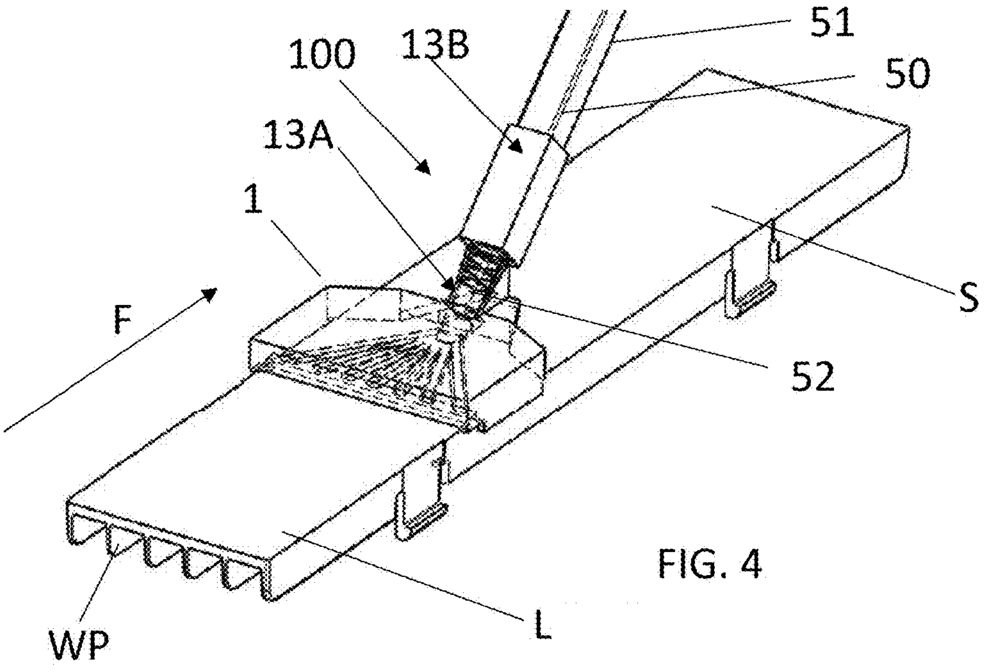
FIG. 4 shows a perspective "transparent" view of an adhesive dispensing arrangement according to a further embodiment of the disclosure herein.

FIG. 4 shows an adhesive dispensing arrangement 100 according to an embodiment of the disclosure herein, comprising applicator 1 and source 50 of adhesive configured to deliver adhesive to applicator 1.

Referring to FIGS. 1 and 4, applicator 1 comprises a dispenser-receiving portion 13 for receiving a source 50 of adhesive. Dispenser-receiving portion 13 comprises a nozzle-receiving portion 13A that is shaped to receive a nozzle of a source of adhesive. In this case, nozzle-receiving portion 13A comprises a frusto-conical inner surface for receiving a frusto-conical nozzle 52 of a source of adhesive. Nozzle-receiving portion 13A is provided with three inwardly-projecting ribs 14A-C that, in use, positively engage with an inserted nozzle, thereby securely holding the nozzle and inhibiting unwanted removal of the nozzle. Dispenser-receiving portion comprises 13 comprises a portion 13B for receiving a body 51 of a dispenser. When the source 50 of adhesive is correctly inserted in the dispenser-receiving portion 13 of applicator 1, nozzle 52 is located adjacent adhesive inlet 2 so that adhesive may be dispensed from nozzle 52 into adhesive inlet 2.

It should be noted that the deposited adhesive, prior to contacting the adhesive with an adhesive-contacting surface, is not necessarily in the form of a film. The deposited adhesive is typically in the form of a pool or patch of adhesive. It is the contacting of the adhesive-contacting surface with the adhesive, coupled with the movement of the adhesive-contacting surface over the adhesive that causes the formation of a film of adhesive.

As described above, the movement of the adhesive-contacting surface is in a forwards direction (the adhesive being deposited in front of the adhesive-contacting surface(s)). This causes the movement of the adhesive-contacting surface over the deposited adhesive. Adhesive is continuously deposited in front of the adhesive-contacting surface and the adhesive-contacting surface is moved continuously until the desired film of adhesive is deposited.

The adhesive is deposited using an applicator that comprises the adhesive-contacting surface, with the applicator being used to both deposit the adhesive and to form a strip of adhesive from the deposited adhesive. The applicator is applicator 1, which is moved forwards by hand.

The method described above has proved to be very effective in applying adhesive at high speeds.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

The examples above describe the use of seven outlets through which adhesive is dispensed. Those skilled in the art will realize that a different number of outlets may be used.

The examples above describe the use of outlets that are "sausage shaped" in cross-section i.e. slightly elongate with rounded (in this case, semi-circular) ends. Those skilled in the art will realize that other shapes may be used, for example, circular, elliptical, oval, square or hexagonal.

The examples above describe the channels are being in one plane that is substantially parallel with the base of the applicator. Those skilled in the art will realize that this need not be the case. The channels need not be in one plane, and that plane need not be substantially parallel with the base of the applicator.

The examples above describe the use of the applicator to deposit adhesive. Those skilled in the art will realize that the applicator may be used to deposit other similar liquids, such as sealants.

The examples above describe the use of the applicator to deposit adhesive onto a surface of an aircraft components. Those skilled in the art will realize that the applicator is suitable for depositing films of liquid on other surfaces.

The examples above describe adhesive applicators that are manually-operated. Those skilled in the art will realize that this need not be the case. The adhesive applicators of the disclosure herein may be operated mechanically, for example, using a robot.

The examples above describe an applicator that is removable from, and attached to, a source of adhesive. Those skilled in the art will realize that the applicator may be integral with a source of adhesive.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

It should be understood that modifications, substitutions, and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An applicator for applying an adhesive film to a workpiece surface of a workpiece, the applicator comprising:

an inlet for receiving adhesive from a source of adhesive;

a plurality of outlets for dispensing of the adhesive therethrough;

a plurality of channels arranged in a splayed or fan arrangement, at least two of the channels being configured to facilitate delivery of the adhesive from the inlet to a respective, mutually-different outlet of the plurality of outlets;

one or more reservoirs for receiving the adhesive from a respective outlet of the plurality of outlets;

one or more adhesive-contacting surfaces for contacting the adhesive that has been deposited onto the workpiece surface, in a reservoir of the one or more reservoirs, as the applicator is moved across the workpiece surface, thereby forming the adhesive film on the workpiece surface; and wherein the one or more adhesive-contacting surfaces are configured to be maintained in spaced relationship with the workpiece surface, onto which the adhesive film is to be formed.

2. The applicator according to claim 1, comprising a base, wherein a depth of the one or more reservoirs relative to the base of the applicator is greater at a position adjacent to the outlets than at a position adjacent to the one or more adhesive-contacting surfaces.

3. The applicator according to claim 1, wherein a cross-sectional area of the one or more reservoirs, which is normal to a longitudinal axis of the applicator and at a position adjacent to the outlets, is greater than a cross-sectional area of the one or more reservoirs at a position adjacent to the one or more adhesive-contacting surfaces.

4. The applicator according to claim 1, wherein:

each of the channels is configured to facilitate delivery of the adhesive from the inlet to a respective, mutually-different outlet of the plurality of outlets; and separation of adjacent outlets of the plurality of outlets is identical for all pairs of the adjacent outlets.

5. The applicator according to claim 1, comprising:

rails for retaining the applicator in position relative to the surface onto which the adhesive film is to be formed, optionally wherein the rails define a gap therebetween for receipt of a workpiece; and/or a base and at least two rails, which are located on opposite sides of the base.

6. The applicator according to claim 1, wherein the channels are arranged in a plane, so as to be coplanar with each other, optionally wherein the applicator is configured so that the plane is parallel to a surface onto which an adhesive film is to be deposited.

7. The applicator according to claim 1, wherein the one or more reservoirs is only one reservoir.

8. The applicator according to claim 1, wherein the one or more reservoirs comprise:

a first reservoir configured to receive the adhesive from a first set of outlets of the plurality of outlets; and a second reservoir configured to receive the adhesive from a second set of outlets of the plurality of outlets.

9. The applicator according to claim 1, wherein:

the one or more reservoirs extend laterally across the applicator;

the one or more reservoirs has a width measured in a direction normal to a direction of intended movement of the applicator; and the width of the one or more reservoirs is a same as a width of the one or more adhesive-contacting surfaces.

10. The applicator according to claim 1, wherein the one or more adhesive-contacting surfaces are planar and configured to be parallel to the surface onto which the adhesive film is to be deposited.

11. The applicator according to claim 1, comprising a dispenser-receiving portion that comprises a nozzle-receiving portion.

12. The applicator according to claim 1, comprising a rigid applicator main body, in which is provided one or more of:

the inlet;

the plurality of outlets;

the one or more reservoirs; and the one or more adhesive-contacting surfaces.

13. An adhesive dispensing arrangement comprising:

the applicator according to claim 1; and an adhesive dispenser configured to dispense the adhesive via the applicator.

14. The adhesive dispensing arrangement according to claim 13, wherein the applicator is attachable to, and removable from, the adhesive dispenser.

15. The adhesive dispensing arrangement according to claim 13, wherein the applicator is integral with the adhesive dispenser.

16. A method of depositing liquid on to a workpiece surface, the method comprising depositing the liquid using the applicator according to claim 1.

17. The method according to claim 16, wherein:

the workpiece is an aircraft component; and the liquid is the adhesive.

18. An adhesive applicator for forming an adhesive film on a workpiece surface of a workpiece, the applicator comprising:

an inlet for receiving an adhesive from a source of the adhesive;

an applicator main body providing:

a plurality of outlets for dispensing of an adhesive therethrough;

one or more reservoirs for receiving the adhesive from the plurality of outlets;

a plurality of channels, each of which is configured to facilitate delivery of the adhesive from the inlet to a respective one of the plurality of outlets;

a base; and one or more adhesive-contacting surfaces for contacting the adhesive that has been deposited onto the workpiece surface, in a reservoir of the one or more reservoirs, as the applicator is moved across the workpiece surface, thereby forming the adhesive film on the workpiece surface; and wherein the one or more adhesive-contacting surfaces are configured to be maintained in spaced relationship with the workpiece surface, onto which the adhesive film is to be formed; and wherein a depth of the one or more reservoirs relative to the base of the applicator is greater at a position adjacent to the outlets than at a position adjacent to the one or more adhesive-contacting surfaces.

19. The adhesive applicator according to claim 18, comprising rails for retaining the adhesive applicator in position relative to the workpiece surface onto which the adhesive film is to be formed, the rails defining a gap therebetween for the receipt of the workpiece.

20. An applicator for applying an adhesive film to a workpiece surface of a workpiece, the applicator comprising:

an inlet for receiving adhesive from a source of adhesive;

a plurality of outlets for dispensing of the adhesive therethrough;

a plurality of channels, at least two of the channels being configured to facilitate delivery of the adhesive from the inlet to a respective, mutually-different outlet of the plurality of outlets;

one or more reservoirs for receiving the adhesive from a respective outlet of the plurality of outlets; and one or more adhesive-contacting surfaces for contacting the adhesive that has been deposited onto the workpiece surface, in a reservoir of the one or more reservoirs, as the applicator is moved across the workpiece surface, thereby forming the adhesive film on the workpiece surface;

wherein the one or more adhesive-contacting surfaces are configured to be maintained in spaced relationship with the workpiece surface, onto which the adhesive film is to be formed; and wherein:

a cross-sectional area of the one or more reservoirs, which is normal to a longitudinal axis of the applicator and at a position adjacent to the outlets, is greater than a cross-sectional area of the one or more reservoirs at a position adjacent to the one or more adhesive-contacting surfaces; and/or the one or more reservoirs comprise:

a first reservoir configured to receive the adhesive from a first set of outlets of the plurality of outlets; and a second reservoir configured to receive the adhesive from a second set of outlets of the plurality of outlets.

* * * * *